(12) United States Patent
Frohnhaus et al.

(10) Patent No.: US 6,260,672 B1
(45) Date of Patent: Jul. 17, 2001

(54) VEHICLE SEAT WITH AN ADJUSTING MECHANISM

(76) Inventors: Ernst-Reiner Frohnhaus, Nettelbeckstrasse 4, D-42653 Solingen (DE); Burckhard Becker, Obenkatternberg 25, D-42655 Solingen (DE); Michael Lingner, Am Röttchen 25, D-40468 Düsseldorf (DE)

( * ) Notice: Subject to any disclaimer, the term of this patent is extended or adjusted under 35 U.S.C. 154(b) by 0 days.

(21) Appl. No.: 09/372,694

(22) Filed: Aug. 11, 1999

(30) Foreign Application Priority Data

Aug. 17, 1998 (DE) .......................................... 298 14 626 U

(51) Int. Cl.$^7$ ..................................................... F16D 65/14
(52) U.S. Cl. ........................... 188/109; 248/422; 248/419; 297/344.13; 297/344.17
(58) Field of Search ...................................... 248/422, 419, 248/420; 297/344.1, 344.11, 344.12, 344.13, 344.17; 188/109

(56) References Cited

U.S. PATENT DOCUMENTS

| | | | |
|---|---|---|---|
| 4,186,904 | * 2/1980 | Reinmoller et al. | 248/395 |
| 4,966,045 | * 10/1990 | Harney | 297/344 |
| 5,427,345 | * 6/1995 | Yamakami et al. | 248/394 |
| 5,762,309 | * 6/1998 | Zhou et al. | 248/429 |
| 5,871,195 | * 2/1999 | Gauger | 248/419 |
| 5,876,096 | * 3/1999 | Yamakami | 297/344.13 |
| 5,882,075 | * 3/1999 | Partington et al. | 297/344.13 |
| 5,899,428 | * 5/1999 | Gauger | 248/430 |
| 5,909,866 | * 6/1999 | Vaidyanathan et al. | 248/429 |

* cited by examiner

*Primary Examiner*—Robert J. Oberleitner
*Assistant Examiner*—Devon Kramer
(74) *Attorney, Agent, or Firm*—K. S. Cornaby

(57) ABSTRACT

The invention presents a vehicle seat with an adjusting mechanism, for example with a height adjustment of the seat area or with a length adjustment of a longitudinal guiding (20, 22), whereas the adjusting mechanism is provided with an electromotor (36), a step-down gear (34) and an adjusting device having a first adjusting element as well as a second adjusting element which may be adjusted relative to the first adjusting element. The adjusting mechanism is additionally provided with a constantly engaged brake (38) that is leading to a braking moment in both senses of rotation of the electromotor (36), the braking moment being calculated so as to be considerably smaller than the active driving moment of the electromotor (36) but so as to be bigger than the passive torques occurring during normal operation of the vehicle due to all kinds of acceleration and loads.

12 Claims, 1 Drawing Sheet

US 6,260,672 B1

VEHICLE SEAT WITH AN ADJUSTING MECHANISM

BACKGROUND OF THE INVENTION

The invention relates to a vehicle seat with an adjusting mechanism, for example with a height adjustment of the seat area or with a length adjustment of a longitudinal guiding, whereas the adjusting mechanism is provided with an electromotor, a step-down gear and an adjusting device having a first adjusting element as well as a second adjusting element which may be adjusted relative to the first adjusting element.

Vehicle seats with one or several adjusting mechanisms are state of the art. They make it possible to achieve an ergonomic adjustment of the vehicle seat and are thus contributing to safety. Compared to mechanical adjusting mechanisms they may particularly be adjusted in a more comfortable way that requires less effort. This makes them more comfortable to use.

Generally, a problem arises with these adjusting mechanisms. In the normal operating state of the vehicle seat, either in positive or negative accelerations in or across the driving direction or under stress, forces are acting between the two adjusting elements and are trying to disarrange them relative to one another. This entails at least small relative movements between the two adjusting elements. A small jerk is thus occasioned that may more or less be felt by the user. It particularly leads to a sound, for example to a click. The object of the invention is to find a remedy hereto.

Generally, the couples of rails of a length adjusting device used to adjust in length the vehicle seat are arranged diagonally to the horizontal plane. As soon as a vehicle seat is loaded with a passenger, relative forces are occurring between the two adjusting elements, in this case between the seat rails and the bottom rails of the length adjusting device. Yet also while driving, for example when braking or taking a curve, forces are trying to move the two adjusting elements relative to one another.

Similar problems arise also with other adjusting mechanisms of a vehicle seat, for example with a height adjustment of the seat, an angle adjustment of the backrest and so on. Here too, relative forces are already occurring under normal driving conditions, as well as when the seat is loaded with a passenger, when driving on a bad surface, and so on.

By an adjusting device with a first and a second adjusting element the following is meant: the two adjusting elements are guided mechanically relative to one another, they are for example linked to each other or may be longitudinally displaced relative to one another. Additionally, they are provided with driving parts as for example a pinion pertaining to the first adjusting element and a toothed rack pertaining to the second adjusting element, or, in the same way, a spindle and a spindle nut and so on. The adjusting device thus comprises the parts that have to be mechanically adjusted relative to one another as well as the driving parts for this mechanical adjustment.

SUMMARY OF THE INVENTION

On the basis thereof the object of the invention is to develop the adjusting mechanism of the type mentioned above so that the relative forces occurring between the two adjusting elements during normal operation of the vehicle become unnoticeable, in the relative movement between the two adjusting elements as well as acoustically.

By normal operating state of the vehicle are meant all the states below accelerations due to an accident, that is in situations in which the electronics of an air bag and other safety electronics reacting in case of an accident have not yet been triggered.

The solution of the invention is to additionally provide the adjusting mechanism with a constantly engaged brake that is leading to a braking moment in both senses of rotation of the electromotor, the braking moment being calculated so as to be considerably smaller than the active driving moment of the electromotor at its place, but so as to be bigger than the passive torques occurring during normal operation of the vehicle due to all kinds of acceleration and loads.

The brake according to the invention is thus initiating such a high braking moment on one shaft of the adjusting mechanism that all forces occurring between the two adjusting elements during normal operation are leading to torques on the same shaft, said torques being smaller. By this means, undesired and involuntary passive torques are not leading essentially to relative movements between the two adjusting elements. The torque initiated by the electromotor on the shaft is far bigger than the braking moment of the brake. Thus, the adjusting mechanism is always adjusted when the electromotor is actuated.

In a preferred formation, the brake is situated in the range of a small number of revolutions, that is for example between the step-down gear and the adjusting device. Thus, length adjusting devices for example are typically working with a motor-driven pinion being in mesh with a toothed rack. Typically, the brake is then located between pinion and step-down gear.

In a preferred embodiment, the braking moment of the brake is the same in both senses of rotation. On one hand this leads to a simpler design of the brake, on the other hand it may happen that in practice the accelerations and loads are occurring in all possible directions and that they have to be intercepted.

In a preferred embodiment the brake has a dynamometer that is working as a clamping member and that encompasses a cylindrical part of the shaft to be braked by sparing a slot running on an axial plane. The dynamometer is preloaded by means of a flexible means so that the slot is compressed. Between the cylindrical part of the shaft to be braked and the dynamometer two surfaces are in contact and are sitting close to each other with friction. The friction surface preferably has a friction member of its own arranged in the dynamometer, the inner surface of said friction member constituting the friction surface of the dynamometer.

The dynamometer has appropriate fastening means, so that it may be fastened on a gear or on the mechanical part of the adjusting device into which the actuation is triggered. In a preferred embodiment the friction surface is constituted between a steel tube on one side and a particularly duroplastic synthetic on the other or between an aluminium tube on one side and again a synthetic, more particularly a duroplastic on the other side. The friction surface may also be formed by a magnetic slot and constitute a so-called magnetic-particle brake.

Further advantages and characteristics of the invention will become clear in the other claims and in the description of the embodiments of the invention.

BRIEF DESCRIPTION OF THE DRAWINGS

The embodiments mentioned are examples and are not limiting the scope of the invention. Said embodiments are shown in the drawing with the aid of which they will be explained in more details. The drawing shows in.

DESCRIPTION OF A PREFERRED EMBODIMENT

Figure 1:
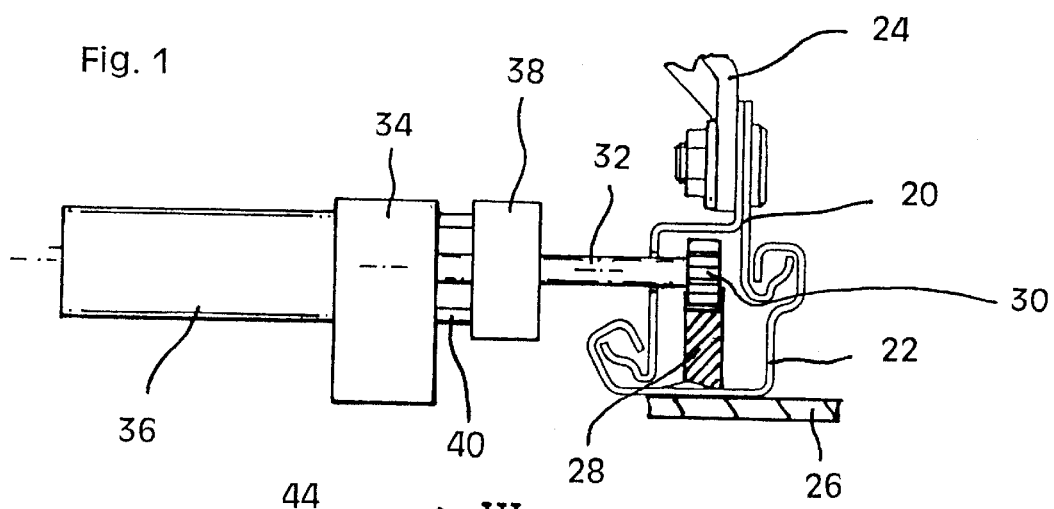
FIG. 1: a side view of an adjusting mechanism for a vehicle seat showing an eclectromotor with a step-down gear and a longitudinal guiding with its actuation.

FIG. 1 shows an adjusting device similar to those known for vehicles. A seat rail 20 and a bottom rail 22 are represented, the two being interlocked. The seat rail 20 is composed of two single profiles and is encompassed. It is engaged with the bottom rail 22 via guiding means, for example rows of balls, that are not shown in detail. The seat rail 20 is linked to a vehicle seat that is not shown in detail but only hinted at by a connecting element 24. The vehicle seat is well-known and needs not to be shown. The bottom rail 22 is linked to an underbody 26 of a corresponding vehicle. Such fastenings are state of the art too. A toothed rack 28 is assigned to the bottom rail 22 and is linked to it. A pinion 30 is rotatably borne in the seat rail 20, is interlocked with the toothed rack 28 and is multiturn actuated via a motor shaft 32. This motor shaft 32 is connected with an electromotor 36 via a gear 34. The component parts and features described up to now are state of the art.

A brake 38 is inserted between the gear 34 and the pinion 30. In the embodiment according to FIG. 1, the brake is propped on the housing of the gear 34 via connecting means 40. In the same way it may be propped on the seat rail 20. A possibility of a concrete design of said brake 38 may be seen in the FIGS. 2 and 3 or in FIG. 4.

Figure 2:
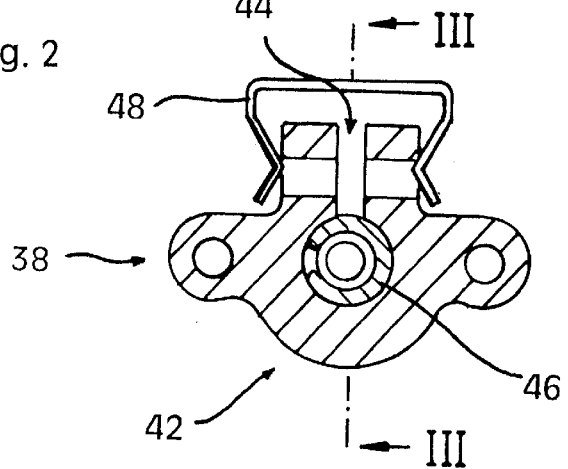
FIG. 2: a sectional view of a brake across the motor shaft, FIG: 3: a sectional view along the line III—III in FIG. 2 and FIG. 4: a representation similar to FIG. 3 of a magnetic-particle brake.
Figure 3:
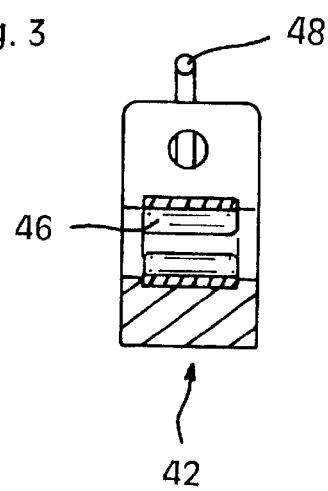
Figure 4:
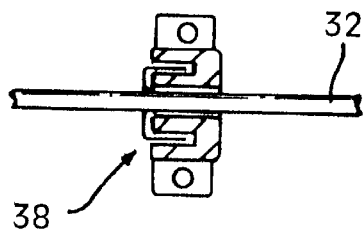

According to the FIGS. 2 and 3, the motor shaft 32 is essentially cylindrical, preferably completely cylindrical in the range of the brake 38. It is encompassed by a dynamometer 42 made of synthetic material for example and encompassing the motor shaft 32 running in an axial plane but for a slot 44. The dynamometer 42 is also provided with a friction member 46 having the shape of a slotted sleeve. Said friction member 46 is arranged, as may be seen in FIG. 3, in a recess of the synthetic member of the dynamometer 42. This friction member 46 is in touch with the motor shaft's surface. The desired braking effect is achieved by matching the stuffs of the motor shaft 32 on one side and of the friction member 46 on the other as well as by mating the pressure between them. It proved advantageous to manufacture the surface of the motor shaft 32 in steel. The friction member 46 is then made for example out of tetrafluoroethylene. In another embodiment, the surface of the motor shaft 32 is made by an extruded tube of aluminium. High density polyethylene proved then to be the best material for the friction member 46. For the friction member 46, combined stuffs such as for example high density polyethylene or tetrafluoroethylene which are having an armouring of synthetic threads, carbon fibres, steel threads or the like and additionally provided with a lubricant such as molybdenum disulphide or graphite proved to be advantageous too.

The body as such of dynamometer 42 is symmetrically designed. The plane of symmetry is on the plane of slot 44. Two fastening holes are provided by means of which the housing of the dynamometer 42 may be fixed, on the housing of the gear 34 for example, as illustrated in FIG. 1. The slot 44 is encompassed by an essentially U-shaped spring 48. This spring squeezes the two arms of the dynamometer 42 on the left and the right side of the slot 44 so that the desired pressure occasioning the required braking moment is being built up between the friction member 46 and the surface of the motor shaft 32. Instead of the spring 48 other mechanical means may be provided to squeeze the arms on either side of the slot 44.

The housing of the dynamometer 42 is preferably made of synthetic material although it may also be made out of another material as for example metal. The actual constructive design of the housing is optional.

What is claimed is:

1. A vehicle seat of a vehicle with an adjusting mechanism of said vehicle seat, said adjusting mechanism is provided with a) an electromotor having a driving moment, b) a step-down gear and c) an adjusting device having a first adjusting element and a second adjusting element, which second adjusting element may be adjusted relative to said first adjusting element, wherein said adjusting mechanism is additionally provided with a constantly engaged brake that is leading to a braking moment on a shaft driven by said electromotor in both senses of rotation of said electromotor, said braking moment being chosen so as to be considerably smaller than said driving moment of said electromotor on said shaft but so as to be bigger than any passive torques occurring on said shaft during normal operation of said vehicle due to all kinds of acceleration and loads acting on said vehicle seat, said brake having a dynamometer a) encompassing, but for a slot running in an axial plane, a cylindrical part of said shaft to be braked and b) having a flexible means acting in said slot and squeezing it and a friction area being provided between said cylindrical part and said dynamometer.

2. The vehicle seat according to claim 1, wherein said friction area is formed between a steel tube on one side and a synthetic material on the other.

3. The vehicle seat according to claim 1, wherein said friction area is formed between a tube of non-anodized, extruded aluminium and a duroplastic.

4. The vehicle seat according to claim 1, wherein said brake is a magnetic-particle brake.

5. The vehicle seat according to claim 1, wherein said braking moment on said shaft is less than 20%, of said driving moment of the electromotor on said shaft.

6. The vehicle seat according to claim 1, wherein said adjusting mechanism is one of a mechanism for a height adjustment of a seat area and a length adjustment of a longitudinal guiding.

7. The vehicle seat according to claim 2, wherein said synthetic material is a duroplastic material.

8. The vehicle seat according to claim 7, wherein said duroplastic material is one of a high density polyethylene (HDPE) and tetrafluorethylene.

9. The vehicle seat according to claim 5, wherein said braking moment is more than 10% of said driving moment.

10. The vehicle seat according to claim 5, wherein said braking moment is more than 5% of said driving moment.

11. The vehicle seat according to claim 1, wherein said braking moment of said brake is the same in both senses of rotation of said electromotor.

12. The vehicle seat according to claim 1, wherein said brake is placed between said step-down gear and said adjusting device.

* * * * *